(12) United States Patent
Huttenbauer, Jr.

(10) Patent No.: US 6,676,986 B1
(45) Date of Patent: Jan. 13, 2004

(54) METHOD OF MAKING FORMED FOOD PUREE PRODUCTS

(76) Inventor: Samuel P. Huttenbauer, Jr., 180 Congress Run Rd., Cincinnati, OH (US) 45215

( * ) Notice: Subject to any disclaimer, the term of this patent is extended or adjusted under 35 U.S.C. 154(b) by 0 days.

(21) Appl. No.: 09/567,737

(22) Filed: May 10, 2000

Related U.S. Application Data

(60) Provisional application No. 60/133,350, filed on May 10, 1999.

(51) Int. Cl.[7] ................................................ A23L 1/317
(52) U.S. Cl. ................... 426/646; 426/272; 426/512; 426/513; 426/573; 426/574; 426/641; 426/800
(58) Field of Search ............................... 426/272, 615, 426/646, 413, 513, 574, 512, 641, 800, 573

(56) References Cited

U.S. PATENT DOCUMENTS

| | | | | | |
|---|---|---|---|---|---|
| 3,234,585 | A | * | 2/1966 | Snyder | 426/513 |
| 4,276,314 | A | * | 6/1981 | Andersen | 426/272 |
| 4,348,420 | A | * | 9/1982 | Lynch et al. | 426/272 |
| 4,436,759 | A | * | 3/1984 | Trilling et al. | 426/574 |
| 4,680,183 | A | * | 7/1987 | van Schouwenburg | 426/64 |
| 4,820,535 | A | * | 4/1989 | Gibson | 426/272 |
| 4,973,492 | A | * | 11/1990 | Gibson | 426/513 |
| 5,322,705 | A | | 6/1994 | Heeps | 426/646 |
| 5,358,731 | A | * | 10/1994 | Sakamoto et al. | 426/574 |
| 5,817,355 | A | * | 10/1998 | Zukerman et al. | 426/272 |

* cited by examiner

Primary Examiner—Lien Tran
(74) Attorney, Agent, or Firm—Frost Brown Todd LLC

(57) ABSTRACT

A method of making formed food products from food purees is disclosed. These products are ideal for use with children or adults who are unable to effectively chew their food due to age or illness. In this method, the food material is comminuted and mixed with relatively low levels of a lubricant/thickener and optionally flavoring or nutritional components (preferably after or while the food material is at a temperature of at least about 71° C.), transferred to a mold preferably in the shape of the original food product, and frozen. The food products made by this method are also disclosed.

7 Claims, No Drawings

METHOD OF MAKING FORMED FOOD PUREE PRODUCTS

This application is based on U.S. Provisional Application No. 60/133,350, Formed Food Puree Products, Huttenbauer, filed May 10, 1999.

TECHNICAL FIELD

The present invention relates to the preparation of processed, formed food products. More specifically, this invention relates to a method of processing and forming food products that possess a viscosity and particulate size suitable for consumption by individuals suffering from chewing and swallowing difficulties. This invention further relates to the processed, formed food products that result from such methods of food product preparation.

BACKGROUND OF THE INVENTION

A significant portion of the adult population is unable to consume food in its conventional form because of an illness or an infirmity which lessens the individual's ability to chew or swallow conventionally prepared solid food. This population segment includes individuals suffering from dental or muscular dysfunctions, paralysis, neurodegenerative and musculodegenerative disorders, stroke, and general geriatric infirmity. Presently such individuals are forced to resort to prepackaged by food, blender-pureed food or other mechanically altered food in order to obtain basic nutritional sustenance.

Currently, individuals requiring mechanically-modified food are served conventional solid foods which have been pureed in a food processor or other kitchen device in order to reduce the particulate size of the food. More specifically, the predominant method of food preparation involves first, mashing or processing a conventional food using a food processor or other similar, particle-reducing device. In some cases the pureed matter is then mixed with lubricating or thickening agents which prevent aspiration upon ingestion. The resulting food product is an unattractive, unappetizing mass of food which retains little of its original flavor or texture and none of its original appearance. Because of the inherent unpalatability of food prepared in this manner, it is often consumed in lesser quantities than conventional solid food is, and, consequently, individuals unable to consume conventional solid food suffer from nutritional deficiencies and thus do not receive the nutritional sustenance necessary to promote healing or well-being. This is particularly problematic as many of these individuals have compromised health to begin with.

Restriction to such unappetizing, mechanically-modified food may have negative psychological effects as well. Most individuals unable to consume conventional solid foods are ill, convalescing, elderly or otherwise precluded from participation in ordinary daily activities. Mealtimes can provide a bit of entertainment and structure to otherwise dreary and uneventful days. The prospect of sitting down to a shapeless mass of tasteless, colorless, pureed food or pre-packaged baby food is disheartening, takes away an adult's self-respect, and can often exacerbate the feelings of depression and isolation already experienced by some ill or elderly individuals.

It would be highly desirable to develop a processed food product that retains the aesthetic and organoleptic characteristics, as well as the nutritional value, of the conventional solid food product from which it was derived, but which also possesses a viscosity and a particulate size suitable for consumption by individuals suffering from chewing and swallowing difficulties. It would also be desirable to develop a method by which such products could be manufactured. The invention of this application achieves these objectives by defining a method of processing and forming conventional solid food which utilizes a combination of processes for particle size reduction and pressure formation, and by disclosing the food products obtained therefrom.

U.S. Pat. No. 5,322,705, Heeps, issued Jun. 21, 1994, describes sliced loaf-type food products made from pureed food material. These products are different from those of the present invention in that they require high levels of a specific mix of starches to act as binders, are not heated during binder/lubricant addition, and are limited to products derived from cylindrical loaves (e.g. slices of chicken or hot dogs).

SUMMARY OF THE INVENTION

The present invention is a method of processing conventional solid food into formed, processed food products possessing small particulate size and low product viscosity in order to facilitate nutritional intake by individuals with chewing and swallowing difficulties. One aspect of this invention is a method of preparing formed food puree products comprising the steps of: (1) obtaining a food material, (2) comminuting said food material by, for example, use of a silent cutter, (3) adding from about 0.2% to about 4% of a lubricant to said comminuted food material, (4) adding flavorings, seasonings, nutritional supplements or other additives to said food material, if desired, (5) transferring said food material to a mold or form (preferably in the shape of the original food material before comminution), and (6) freezing or high-pressure pasteurizing said formed food material. Steps 3 and 4 are preferably accomplished while the food product is maintained at a temperature of at least about 71° C. or after such a heating has taken place.

The present invention also relates to the food products made by this process.

DETAILED DESCRIPTION OF THE INVENTION

The present invention relates, to a method of preparing processed, formed food products suitable for consumption by individuals suffering from chewing and swallowing difficulties, and to the formed food products resulting from use of this method.

The first step of the disclosed method requires the obtaining of a conventional solid food material. The food material used can be any type of conventional foodstuff including, but not limited to, poultry, beef, pork, seafood, tofu, fruits, vegetables, potatoes, eggs, pastries, or pastas. The food material utilized may be cooked, raw, frozen, fresh, canned or preserved in some other manner.

The selected food material is then comminuted by any suitable means known in the art, including, but not limited to, grinding, bowl chopping, horizontal cutting, comitroling or emulsifying until the particulate size of the food product is reduced to a size such that ingestion without mastication is possible. Comminution can be achieved using any implements known in the art, including, but not limited to, a silent cutter, a food processor, a dicer, a comitrol, an extruder, an emulsifier, or a blender. It is preferred that the comminuted food material have a particle size of from about 0.005 to about 0.05 inches (most preferably from about 0.02 to about 0.03 inches). The selected food product may be marinated and vacuum tumbled to incorporate spices and flavoring prior to comminution. The comminuted food material is transferred to a convected oven, thermal screw, heat exchanger, bakery oven, or impingement oven for pathogen destruction, gelling, carmelization, protein denaturization, moisture removal or proofing. A temperature of at least about 71° C. is attained.

Following thermal processing, the food materials may be maintained at this high temperature, or it may be chilled to approximately 5° C. and placed in a bowl chopper with a gel that serves as a lubricant or thickener in an amount that will result in the food material having a viscosity suitable for easy swallowing, but which is not so viscous as to cause aspiration of the food material upon ingestion.

The amount of lubricant or thickener necessary to achieve this balance will vary depending on the identity of the particular lubricant/thickener used and the moisture content of the original food material, i.e., the higher the water content of the material, the lower the amount of the lubricant required. For example, a mixture containing comminuted strawberries will require less lubricant or thickener than a mixture of comminuted poultry. The amount of lubricant necessary will usually be from about 0.2% to about 4% by weight (on a dry weight basis) of the comminuted food material.

Substances which can be used as lubricant or thickener include, but are not limited to, yam flour, rice flour, Konjac flour, wheat flour, tapioca, corn starch, pectins, soy flour, natural gums, gelatins, cellulose, inulin, oat fiber, whey, and potato starch, or a mixture of those materials. Yam flour, rice flour, Konjac flour, tapioca, corn starch, potato starch, natural gums, and mixtures thereof are preferred These materials may be introduced into the food mixture in the form of an aqueous gel, with Konjac flour being a particularly preferred lubricant/thickener.

Seasonings, flavorings and nutritional supplements may be added to the mixture, generally before thermal processing. Seasonings may include any herbs or spices commonly known in the art, including salt and pepper. Flavorings may be naturally or artificially derived. Nutritional supplements of synthetic or natural origin may be added to enhance the existing nutritional value of the food product. If the food product is targeted to individuals suffering from a particular disease or illness, e.g., diabetes, irritable bowel syndrome, Alzheimers Disease, osteo-arthritis, or oncological cardiovascular conditions, a specific nutritional supplement which confers a recognized nutritional advantage to those suffering from the relevant illness may be added.

The comminuted food mixture is then deposited in an individual mold or form which serves to sculpt it into a desired shape. The mold may be any shape, although use of a mold representing the exact shape and detail of the original conventional solid food material is preferred. For example, a comminuted food mixture that was derived from corn is placed in a mold which forms it into a shape representing a longitudinally bisected piece of corn on the cob, a mixture derived from comminuted beef can be molded into the form of a steak, and a mixture derived from chicken can be molded into the form of a boneless chicken breast. The comminuted food mixture can be deposited in such molds or forms by any means. However, use of an eight-head filler has been found to be most efficient for this purpose.

The mixture must be evenly distributed and fairly well packed within the molds to ensure retention of shape upon removal. It has been found that this is best accomplished by subjecting the food material—containing mold to high pressure, at least about 20 p.s.i.

The food material, remaining in the mold, is then either frozen or subjected to ultra-high pressure pasteurization to achieve shelf stability. If the material is frozen, either conventional or cryogenic freezing may be employed, generally to a temperature of from about −25° C. to about −10° C. If the material is rendered shelf stable, with a minimum shelf life at ambient temperature of one year, then it has been found that a two to ten minute exposure to ultra-high isostatic pressure in excess of one hundred thousand (100,000) p.s.i. is required.

To reconstitute the product for serving, it can be either brought to approximately 5.5° C. by refrigerated equilibration or heated to a temperature suitable for consumption by any means known in the art including but not limited to, microwave oven, convection oven, steam oven, infrared, pulsed light and conduction.

The present invention is also directed to processed, formed puree products having a viscosity and particulate size such that they are suitable for consumption by individuals suffering from chewing or swallowing difficulties, made by the process described above.

The present invention is further illustrated by the following non-limiting examples.

EXAMPLE 1

Approximately 800 kilograms of fresh peas are obtained. The peas are then compressed, placed in 28 one-gallon tubs and frozen to about −18° C. Once thoroughly frozen, the peas are tempered to 10° C. by microwave heating and placed in a silent cutter fitted with six, ten-inch long scimitar-shaped blades. A gel consisting of 18.30 kilograms of Konjac flour and a spice mix of salt, pepper, and starch are added to the mixture. In this composition, the Konjac flour and the starch act as the lubricant/thickener and are present at 2.3% of the peas on a dry weight basis. The silent cutter is operated for about 10 revolutions until the particle size of the pea mix is reduced to about 0.023 inches in diameter. The mixture is loaded into an eight headed stuffing machine and dispensed into pea shaped molds. The pea mixture is forced into the molds through application of 20 p.s.i. of air pressure. Plastic sealing film is placed over the open portion of the molds. The individual pea containing molds are either frozen at −18° C. or treated under ultra-high pressure at 100,000 p.s.i. to render the product shelf stable for at least one year.

After freezing or pressure treating, the individual formed pea mixture is removed from the molds and placed on individual plates. Before serving, the pea mixture is heated to 75° C. in a steam oven, convection oven, conventional oven, pulsed light oven, conduction oven, or microwave oven for between about 2 and about 20 minutes.

EXAMPLE 2

Approximately 800 kilograms of fresh corn is obtained. The fresh corn is passed through a comitrol until the particle size of the corn is reduced to about 0.050 inches in diameter. The comminuted corn is then pumped through a scraped surface heat exchanger until an internal temperature of 71° C. is reached. The corn is then placed in 28 one gallon tubes and frozen to about −18° C. The frozen corn is tempered to 10° C. by microwave heating and placed in a silent cutter with six, ten inch long scimitar-shaped blades. A gel composed of 24 kilograms of Konjac flour and 18.10 kilograms of a spice mix containing salt, pepper and starch are added to the mixture while the silent cutter is simultaneously mixing and reducing the particle size to 0.023 inches in diameter. In this composition, the Konjac flour and starch act as the lubricant/thickener and are present at 2% of the corn on a dry weight basis. The mixture is then loaded into an eight headed stuffing machine and dispensed into individual ear of corn shaped molds. The corn mixture is forced into the molds through application of 20 p.s.i. air pressure.

Plastic sealing film is placed over the open portion of the molds. The corn-containing molds are either frozen to −18° C., or treated under ultra-high pressure at 100,000 p.s.i. to render the product shelf stable at ambient temperature for at least one year.

After freezing or pressure treating, individual formed products are removed from the molds and placed on individual plates. Before serving the corn mixture, it is heated to 75° C. in either a conventional oven, steam oven, microwave oven, convection oven or conduction oven for between about 2 and about 20 minutes.

EXAMPLE 3

Approximately 800 kilograms of Pacific Northwest salmon is obtained. The salmon is placed with 7.2 kilos of a spiced garlic powder, onion powder and white pepper mixture in a vacuum tumbler and tumbled for approximately 10 minutes. The salmon mix is then trayed, placed in convection oven and cooked at 104° C. for two hours. The salmon mixture is chilled after cooking to 1° C. and placed in a silent cutter fitted with six ten inch long scimitar-shaped blades. 86.32 kilos of an aqueous gel comprised of Konjac flour and carrageenan is added to the cutter. In this composition, the Konjac flour and the carrageenan act as the lubricant/thickener which is present at 4% of the salmon on a dry weight basis. The cutter is operated for about ten revolutions until the particle size of the salmon mixture is reduced to about 0.023 inches in diameter. The salmon mixture is then frozen to −18° C. The frozen salmon mixture is tempered to 5° C. by means of a microwave oven. The salmon mixture is then heated by means of a convection oven to 82° C., loaded into an eight headed stuffing machine and dispensed into fish filet shaped molds. The salmon mixture is forced into the molds through application of 20 p.s.i. of air pressure. Plastic sealing film is placed over the open portion of the molds. The salmon-containing molds are either cooled to −18° C. until frozen and solid, or pressurized at 100,000 p.s.i. if the salmon is to be kept shelf stable for up to a year. After freezing or pressurization, the individual formed products are removed from the molds and placed on individual plates. Before serving, the formed salmon mixture is heated to 75° C. in a steam oven, convected oven, conventional oven, microwave oven, pulsed light oven, conduction oven or other methods, for between about 2 and about 20 minutes.

EXAMPLE 4

Approximately 800 kilograms of 85% lean boneless beef is obtained. The beef is placed with 9.52 kilos of a spice mix consisting of salt, cocoa, onion powder, garlic powder, onion powder and caramel color and pepper in a vacuum tumbler and tumbled for approximately 10 minutes. The beef mix is then trayed, placed in a convection oven and cooked at 104° C. for six hours. The beef mix is chilled after cooking to 1° C. and placed in a silent cutter fitted with six ten inch long scimitar-shaped blades. 97.6 kilograms of an aqueous gel comprised of Konjac flour and a spice package comprised of thyme, salt, modified starch, pepper garlic powder, cocoa, onion powder and caramel color is added to the cutter. In this composition, the Konjac flour and the modified starch act as the lubricant/thickener which is present at 4% of the beef on a dry weight basis. The cutter is operated for about ten revolutions until the particle size of the beef mix is reduced to about 0.023 inches in diameter. The beef mixture is then stuffed into 20# bags and frozen to −18° C. The beef mixture is then heated by means of a convection oven to 82° C., loaded into an eight headed stuffing machine and dispensed into individual beef strip steak shaped molds. The beef mixture is forced into the molds through application of 20 p.s.i. of air pressure.

Plastic sealing film is placed over the open portion of the molds. The beef-containing molds are either placed at −18° C. until frozen and solid, or pressurized at 100,000 p.s.i. if the beef steak is to be kept shelf stable for up to a year. After freezing or pressurization, the individual formed products are removed from the molds and placed on individual plates. Before serving, the formed beef mixture is heated to 75° C. in a steam oven, convected oven, conventional oven, microwave oven, pulsed light oven, conduction oven or other methods for between about 2 and about 20 minutes.

EXAMPLE 5

Approximately 800 kilograms of fresh frozen strawberries is obtained. The frozen strawberries are passed through a comitrol until the particle size of the strawberries is reduced to about 0.050 inches in diameter. The comminuted strawberries are then pumped through a scraped surface heat exchanger until an internal temperature of 71° C. is reached. The strawberries are then placed in 28 one gallon tubes and frozen to about −18° C. The frozen strawberries are tempered to 10° C. by microwave heating and placed in a silent cutter with six, ten inch long scimitar-shaped blades.

132 kilograms of an aqueous gel comprised of white sugar, corn syrup and starch are added to the mixture while the silent cutter is simultaneously mixing and reducing the particle size to 0.023 inches in diameter. In this composition, the starch acts as the lubricant/thickener which is present at 4% of the strawberries on a dry weight basis. The mixture is then loaded into an eight headed stuffing machine and dispensed into individual strawberry shaped molds. The strawberry mixture is forced into the molds through application of 20 p.s.i. air pressure.

Plastic sealing film is placed over the open portion of the molds. The individual strawberry containing molds are either frozen to −18° C., or treated under ultra-high pressure at 100,000 p.s.i. to render the product shelf stable at ambient temperature for at least one year.

After freezing or pressure treating, individual formed products are removed from the molds and placed on individual plates. The plated potions are then placed under approximately 4° C. of refrigeration and allowed to equilibrate for about 4 hours.

The product is then served.

EXAMPLE 6

Approximately 800 kilograms of naturally enhanced DHA/Omega 3 liquid eggs are obtained. The eggs are mixed with a spice mix containing 14 kilograms of salt and pepper. The egg mix is pumped into 15 pound cooking casings and heated to 121° C. for 1½ hours. The egg mix is tempered to approximately 10° C. by microwave heating and placed in a silent cutter with six ten-inch long scimitar-shaped blades. An aqueous gel comprising 28 kilograms Konjac flour is added to the mixture while the silent cutter is simultaneously mixing and reducing the particle size to 0.023 inches in diameter. In this composition, the Konjac flour acts as the lubricant/thickener and is present at 0.9% of the eggs on a dry weight basis. The mixture is then loaded into an eight headed stuffing machine and dispensed into individual scrambled egg or egg omelet molds. The egg mixture is forced into the molds through application of 20 p.s.i. air pressure.

Plastic sealing film is placed over the open portion of the molds. The individual scrambled egg or omelet molds are either frozen to −18° C., or treated under ultra-high pressure at 100,000 p.s.i. to render the product shelf stable for at least one year.

After freezing or pressure treating, individual portioned molds are removed and placed on individual plates. Before serving the egg mixture it is heated to 73° C. in either a conventional oven, steam oven, microwave oven or conduction over for between about 2 and about 20 minutes.

EXAMPLE 7

Approximately 800 kilograms of a premixed formula containing enriched flour, corn flour, sugar, baking powder and vegetable oil is obtained. The premix is combined with 1,000 kilograms of a mixture of skimmed (fat free) milk and liquid naturally enhanced DHA/Omega 3 eggs in a vacuum blender and processed for eight minutes. The flour mixture is then placed in approximately 36-inch by 24-inch pans to a depth of 2 inches. The pans are placed in a convection oven and heated to 135° C. for 12 minutes. The product is removed from the pans after heating and placed in bags, then frozen to −18° C. The frozen flour mix is tempered by means of a microwave oven and placed in a silent cutter fitted with six ten-inch long scimitar-shaped blades. A gel comprised of 96 kilograms of Konjac flour, crystalean and sodium caseinate is added to the mix. In this composition, the Konjac flour and the crystalean act as the lubricant/thickener which is present at 4% on a dry weight basis. The silent cutter is operated for approximately ten revolutions until the flour mix is reduced to about 0.023 inches in diameter. The flour mix is then frozen to −18° C. The flour mix is then tempered to 5° C. by means of a microwave oven. The flour mixture is then loaded into an eight headed stuffing machine and dispensed into individual molds sculpted into the form of either a waffle, french toast, or pancakes. The flour mixture is forced into the molds through application of 20 p.s.i. air pressure.

Plastic sealing film is placed over the open portion of the molds. The individual waffle, french toast, or pancakes are either frozen to −18° C., or treated under ultra-high pressure at 100,000 p.s.i. to render the product shelf stable for at least one year.

After freezing or pressure treating, individual portions are removed and placed on individual plates. Before serving, the flour items are heated to 73° C. in either a conventional oven, steam oven, microwave oven, or conduction oven for between about 2 and about 20 minutes.

EXAMPLE 8

Approximately 800 kilograms of a mixture containing Semolina flour, Niacin, Iron Mononitrate, riboflavin and Folic Acid is procured. The pasta mix is combined with 400 kilograms water in a heated, vacuum mixer and heated to 82° C. The pasta mixture is then emptied into bags and frozen to −18° C. The pasta mix is tempered to 5° C. by use of a microwave oven and placed in a silent cutter fitted with six ten-inch long scimitar-shaped blades. 120 kilograms of an aqueous gel comprised of Konjac flour, salt and naturally enhanced DHA/Omega 3 eggs is added. In this composition, the Konjac flour acts as the lubricant/thickener and is present at 0.8% of the pasta mix on a dry weight basis. The silent cutter is operated for about 10 revolutions until the particle size of the pasta mix is reduced to about 0.023 inches in diameter. The pasta mix is placed in 20-pound bags and frozen to −18° C. The pasta mix is then tempered to 5° C. by use of a microwave oven and then heated to 72° C. in a convection oven. The pasta mixture is loaded into an eight headed stuffing machine and dispensed into spaghetti shaped molds. The mixture is forced into the mold through application of 20 p.s.i. air pressure. Prior to injection of the pasta mix into the mold, a sauce of meat or cheese may be placed in the mold by employing a sauce depositor. Plastic sealing film is placed over the open portion of the molds. The individual pasta containing molds are either frozen at −18° C., or treated under ultra-high pressure at 100,000 p.s.i. to render the product shelf stable for at least one year.

After freezing or pressure treating, the individual portioned molds are removed and placed on individual plates. Before serving, the pasta mixture is heated to 75° C. in a steam oven, conventional oven, conduction oven, or microwave oven for between about 2 and about 20 minutes.

EXAMPLE 9

Approximately 800 kilograms of a pre-baked pre-comminuted mix of enriched wheat flour, sugar, vegetable shortening, water, salt, sodium bicarbonate, ammonium bicarbonate, tricalcium phosphate, artificial flavor and soy lecithin is placed in a bowl chopper fitted with six ten-inch long scimitar-shaped blades. 554 kilograms of an aqueous gel comprising Konjac flour, starch, calcium caseinate and dried milk is added to the bowl chopper. In this composition, the Konjac flour and starch act as the lubricant/thickener which is present at 3.9% of the pastry mixture on a dry weight basis. The silent cutter is operated for about 10 revolutions until the particle size of the pastry mix is reduced to about 0.023 inches in diameter.

The pastry mixture is loaded into an eight headed stuffing machine and dispensed into individual doughnut shaped molds. The pastry mixture is forced into the mold through the application of 20 p.s.i. of air pressure. Plastic sealing film is placed over the open portion of the molds. The individual doughnut containing molds are either frozen at −18° C., or treated under ultra-high pressure at 100,000 p.s.i. to render the product shelf stable for at least one year.

After freezing or pressure treating, the individual formed doughnut mixture is removed from the molds and placed on individual plates. Before serving the doughnut is placed under refrigeration at 7° C. for four hours and allowed to equilibrate.

EXAMPLE 10

Approximately 800 kilograms of frozen dehydrated potato flakes are obtained. The potato flakes are heated to 5° C. by means of a microwave oven. The potatoes are placed in a heated vacuum blender with 520 kilograms of fluid non-fat milk. The potato mixture is blended and heated to 82° C. After blending, the potato mix is packed in 20-pound bags and frozen to −18° C. The frozen potato mix is tempered to 5° C. by use of a microwave oven and placed in a silent cutter fitted with six ten-inch long scimitar-shaped blades. 84 kilograms of an aqueous gel comprising salt, vegetable oil, sodium caseinate, natural flavors and Konjac flour is added. In this composition, the Konjac flour acts as the lubricant/thickener and is present at 0.8% of the potato mix on a dry weight basis. The silent cutter is operated for approximately 10 revolutions until the potato mix is reduced to a particle size of about 0.023 inches in diameter.

The potato mix is then loaded into an eight headed stuffing machine and dispensed into individual molds sculpted into the form of a serving of french fries. The potato mixture is forced into the molds through application of 20 p.s.i. air pressure.

Plastic sealing film is placed over the open portion of the molds. The individual french fry servings are either frozen to −18° C., or treated under ultra-high pressure at 100,000 p.s.i. to render the product shelf stable for at least one year.

After freezing or pressure treating, individual formed products are removed from the molds and placed on individual plates. Before serving, the french fries are heated to 73° C. in either a conventional oven, steam oven, microwave oven or conduction oven for between about 2 and about 20 minutes.

I claim:

1. A method of preparing a formed food puree product comprising:

(a) obtaining a food material;
   (b) comminuting said food material by mechanical means until the particulate size of said food material is reduced to a size such that ingestion can be accomplished without mastication;
   (c) adding konjac flour in the form of an aqueous gel to said comminuted food material in the amount of from about 0.2% to about 4% by weight of said food material;
   (d) optionally adding seasonings, flavorings, nutritional supplements or other additives;
   (e) transferring said food material to a mold or form in the shape of the original uncomminuted food material defined in step (a), said forming taking place under pressure; and
   (f) subjecting the formed food material to a process selected from freezing and pasteurizing;

wherein steps (c) and (d) are carried out on food material which has been heated to at least about 71° C.

2. The method according to claim 1 wherein, in step (f), said formed food product from step (e) is frozen to a temperature of from about −25° C. to about −10° C.

3. The method according to claim 1 wherein the food material is comminuted by a method selected from the group consisting of grinding, bowl chopping, horizontal cutting, comitroling, and emulsifying.

4. The method according to claim 1 wherein one or more nutritional supplements are added to the food material.

5. The method according to claim 1 wherein, in step f, the food product is subjected to ultra-high pressure pasteurization.

6. The method according to claim 1 wherein the particulate size of the food material after step b is from about 0.005 to about 0.05 inch.

7. The method according to claim 1 wherein the pressure under which the forming in step (e) takes place is at least 20 psi.

* * * * *